United States Patent [19]
Farley

[11] 3,765,063
[45] Oct. 16, 1973

[54] STRAP FASTENER END FITTING
[75] Inventor: Holt A. Farley, Plainfield, N.J.
[73] Assignee: Kinedyne Corporation, Mountainside, N.J.
[22] Filed: Oct. 2, 1972
[21] Appl. No.: 294,434

[52] U.S. Cl. ............................ 24/201 D, 105/369 A
[51] Int. Cl. ......................................... A44b 19/00
[58] Field of Search .............. 248/361 A; 24/68 CD, 24/265 CD, 201 D; 105/369 A

[56] References Cited
UNITED STATES PATENTS
3,017,679  1/1962  Elsner .............................. 24/201 D
3,323,186  6/1967  Rennert ..................... 105/369 A X
3,439,390  4/1969  Prete .......................... 24/265 CD X

*Primary Examiner*—Donald A. Griffin
*Attorney*—Harry B. Rook

[57] ABSTRACT

A fastener has a head part connected to the end portion of a strap for separable coaction with a socket part, for example for use in cargo-hold down assemblies, and the head part has a locking member thereon which is releasably held in locking position to lock the head part in connected relation to the socket part, by the pressing of the strap end portion against the locking member when said fastener parts are assembled.

4 Claims, 10 Drawing Figures

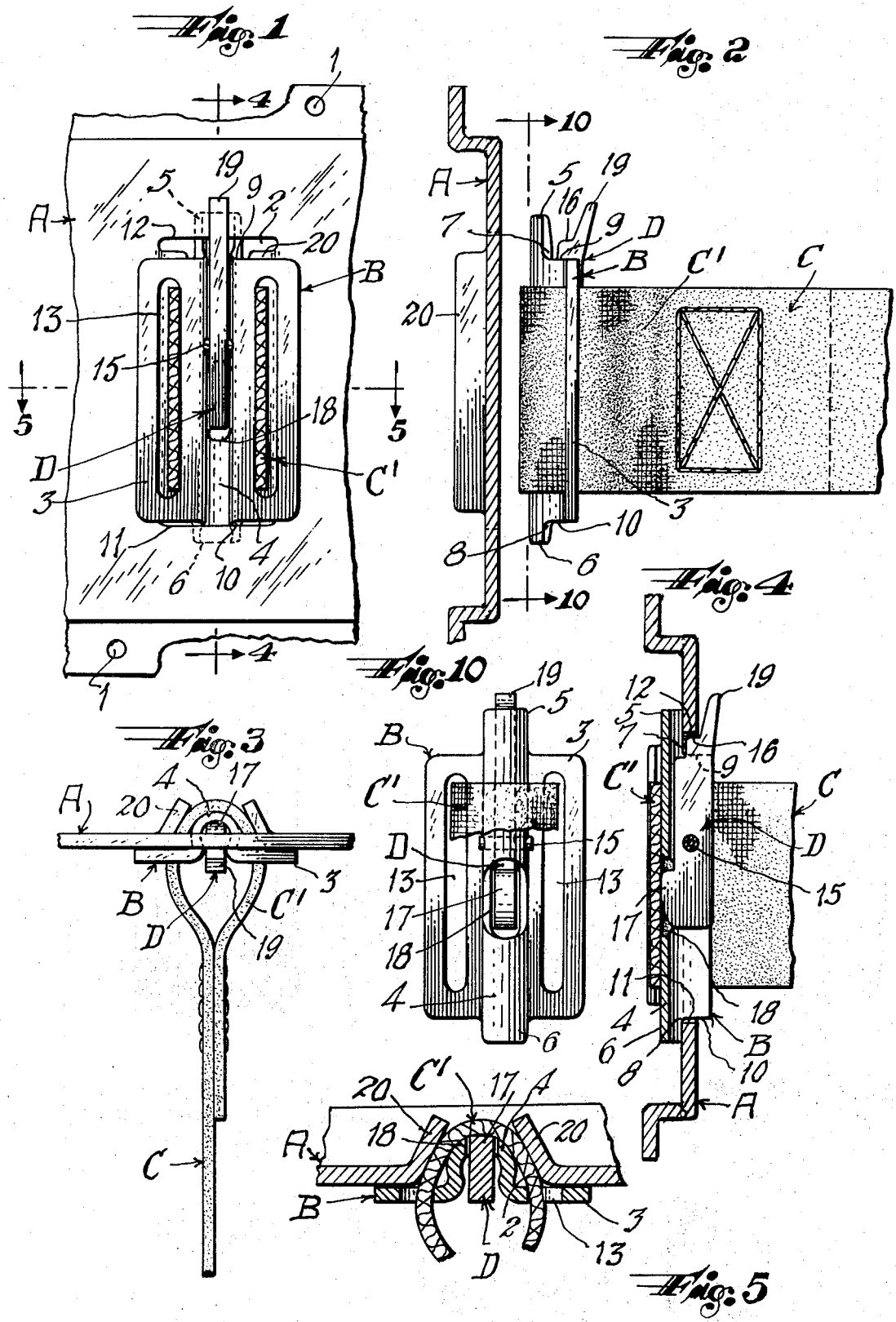

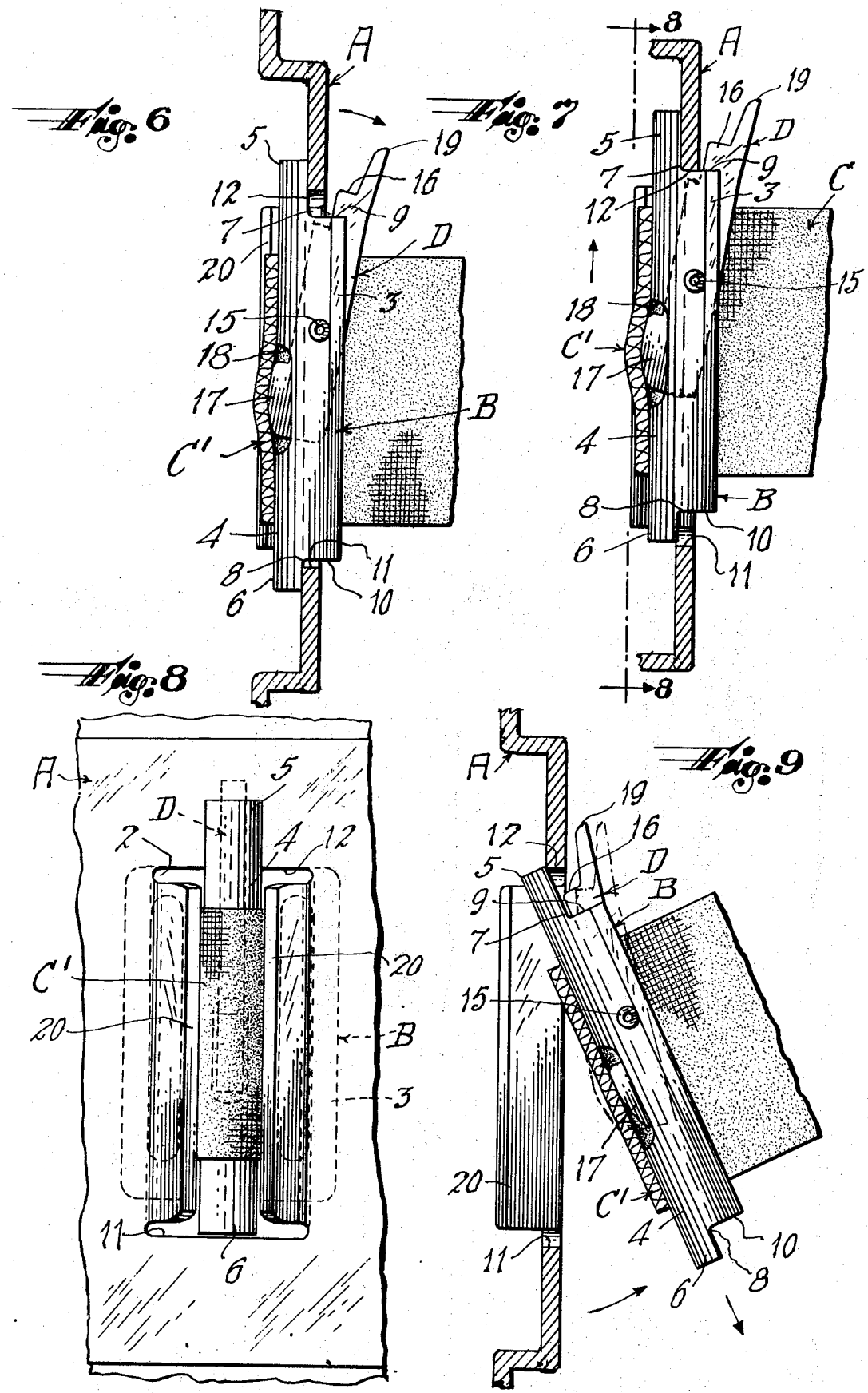

STRAP FASTENER END FITTING

BACKGROUND OF THE INVENTION

This invention relates to a fastener having a head part to be attached, for example, to the end of a strap and separably coact with a socket part, for example, a plate or a so-called track, for use, for example for attaching and releasing a hold-down strap in cargo hold-down assemblies on a motor truck or other vehicle.

In one known prior art device, exemplified by U.S. Pat. No. 3,323,186, a so-called male member attached to the strap end comprises a base which has a tongue and a latch lever pivoted on the tongue and normally spring loaded into engagement with an edge of an opening in a so-called female member to releasably hold the two members connected together.

Another generally similar device, exemplified by U.S. Pat. No. 2980037, is utilized for releasably securing a bar to an anchor member or track in cargo-loading and holding apparatus and comprises a U-shaped body structure to be connected to one end of a bar and having flanges to be separably inserted into an opening in an anchor member or track, between which flanges is pivoted a locking lever normally gravitationally influenced into juxtaposition to one edge of said opening to releasably hold the body structure connected to the anchor member.

Other prior art devices comprise a multiplicity of loosely connected parts, as shown for example by U.S. Pat. No. 2,994,885, or a complex assembly of two plates exemplified by U.S. Pat. No. 3,178,790.

The prior art devices leave much to be desired in that either they are unreliable because the two fastener parts may become accidentally separated by failure of the spring or gravitational force to hold the latch or the locking level in fastener-locking position, or the construction and assembly of the parts of the devices, including the latch and locking lever and the respective male part and U-shaped body part, are excessively complicated and expensive, or too difficult to use.

SUMMARY OF THE INVENTION

A primary object of the present invention is to provide a strap fastener which overcomes the objections to and disadvantages of the prior art devices and which is simple in construction, easy to use, reliable in operation and wherein the locking lever or latch will be held positively, as contrasted with spring or gravity biased, in locking position when the head part has the strap connected thereto and is inserted into the socket part.

Another object is to provide a strap end fastener wherein the end of the latch or locking lever opposite the locking end which coacts with the edge of the opening in the track, is overlaid by a strap end loop which attaches the head part to the strap so that tension on the loop swings and holds the locking end of the locking lever in locking relation to said edge of the opening.

The invention also contemplates such a strap end fastener wherein the socket part has flanges at opposite longitudinal sides of the opening inclined and spaced apart for pressure thereagainst of the strap loop as the head part is inserted into the socket part so that the locking lever is swung into locking position.

A BRIEF DESCRIPTION OF THE DRAWINGS

For a more complete understanding of the invention, reference should be had to the following description in conjunction with the accompanying drawings in which:

FIG. 1 is a front elevational view of a strap end fastener embodying the invention with the head part and the socket part assembled or connected together and with portions of the socket part or track and portions of the strap broken away for clearness in illustration;

FIG. 2 is a side elevation of the head part and a strap end portion before assembly thereof with the socket part or track which is shown in vertical section;

FIG. 3 is a top plan view of the assembled head part and socket part as shown in FIG. 1;

FIG. 4 is a vertical sectional view approximately on the plane of the line 4—4 of FIG. 1;

FIG. 5 is an enlarged fragmentary horizontal sectional view on the plane of the line 5—5 of FIG. 1;

FIG. 6 is an enlarged vertical sectional view through the socket part and a side elevational view of the head part, illustrating the relative position of the parts during the first step in the disassembly and the last step in the assembly thereof;

FIG. 7 is a similar view showing the second step to disassemble and the second step to assemble the head part and the socket part;

FIG. 8 is a rear elevational view of the parts taken from the plane of the line 8—8 of FIG. 7;

FIG. 9 is a view similar to FIG. 6 showing the relative positions of the parts during the last step in the disassembling of the head part and the socket part and the first step in the assembling thereof, and FIG. 10 is a rear elevational view of the head part connected to the strap end portion, taken on the plane of the line 10—10 of FIG. 2 with portions of the strap broken away and shown in section.

DESCRIPTION OF THE PREFERRED EMBODIMENT

For the purpose of illustrating the principles of the invention, the strap end fastener is shown for use in cargo hold-down assemblies of the type that include a metal plate or srap A, sometimes called a track, secured, for example, to the wall or bed of the body of a motor truck or other vehicle. The track is provided with a plurality of holes 1 to receive fastener elements, for example bolts or screws for securing the track on the vehicle. In the present instance said track is considered to be the socket element of the fastener of the invention with which separably coacts a head part B.

The socket part A has at least one rectangular opening 2, and the head part B includes an elongated rectangular plate-like body 3 wider and shorter than said rectangular opening in the socket part and formed with a corrugation 4 extending longitudinally of one side thereof centrally of its width with first and second extensions 5 and 6 beyond the respective ends of the plate-like body. Said corrugation is longer than the opening 2 in the socket part and is formed with first and second notches 7 and 8 in the sides of the extensions 5 and 6, respectively, at the other side of the plate-like body and extending inwardly from the extremities of the respective extensions with their respective inner ends 9 and 10 spaced apart a distance less than the length of said opening 2 in the socket part; and the distance between the inner end of the first notch and the extremity of the corresponding extension 5 is greater than the distance between the inner end 10 of the second notch and the extremity of its corresponding extension 6 so that the first extension and the second extension may be inserted in succession through said opening 2 in the socket part from one side of the socket part upon tilting of the head part as shown in FIG. 9 and then sliding of the head part alternately in opposite directions to cause engagement in succession of said extensions 5 and 6 with the other side of the socket part as shown in FIG. 6 and to position the inner end 10 of the second notch in abutment with the edge of one narrow side 11 of the socket part opening and locate the inner end 9 of the first notch a distance from the edge of the other narrow side 12 of the socket part opening greater than the length of the second extension, as best shown in FIGS. 6, 4 and 1, which show the head part connected to or assembled with the socket part.

The head part has longitudinal slots 13 at opposite sides of the corrugation 4 through which and over the corrugation one end portion of a flexible strap C may be looped and secured as best shown in FIGS. 1–4. The loop C' loosely engages the corrugation when the two fastener parts are separated or disconnected from each other and in accordance with one feature of the invention, the tension or pressure on the loop when the head is connected to the socket part holds a locking member D in locking position so as to prevent unintentional separation of the head part from the socket part.

In the present instance, the locking member D comprises a lever pivoted on a pin 15 intermediate its ends on the head part and within the corrugation 4, with one end formed with a shoulder 16 disposed beyond the inner end 9 of the first notch and also formed with a lug 17 at its other end which extends laterally outwardly through a slot 18 in the corrugation so that in one position of said lever, when the head part is in said opening 2 of the socket part, said shoulder is closely juxtaposed to the edge of the corresponding narrow side 12 of said socket part opening in locking position to lock the head part against movement out of said opening as shown in FIG. 4. When the lever is in said locking position, and the strap loop C' is under tension, said loop engages the lug 17 so as to swing and hold the lever in locking position as shown in FIGS. 1 and 4. The lever has a finger piece 19 for manual swinging of the lever to press said lug 17 against the flexibility or resiliency of the strap loop as shown in FIGS. 6 and 7 and move said shoulder 16 away from said edge 12 of the socket part opening and thereby allow the head part to be slid in said opening from the position shown in FIG. 6 to the position shown in FIGS. 7 and 8 and then tilted out of said opening as shown in FIG. 9 to separate the head part from the socket part.

In accordance with another feature of the invention, the socket part has flanges 20 at the rear side thereof opposite the head part and at opposite longitudinal sides of the opening 2, which converge toward each other and are spaced apart a distance for pressure thereagainst of the strap loop C' when the head part is inserted into said socket part opening from the front side of socket part, so that when the head part is inserted into said opening the strap loop presses against the lug 17 of the locking lever to swing and hold said lever in said locking position, as best shown in FIGS. 3 and 5. With this construction, the head part will be preliminarily held in locked position in the socket part, even before tension is applied to the strap C incident to tying down a cargo, and when the strap is tightened in cargo holding position, the locking lever is positively held in its locking position shown in FIGS. 1 and 4.

FIG. 2 of the drawings shows the head part disconnected from the socket part, prior to the first step in assembling or connecting the parts as shown in FIG. 9, and when it is desired to disconnect the parts from the locked position shown in FIG. 4, the tension on the strap is released and the locking lever is swung by the finger piece 19 into fastener-releasing position with the shoulder 16 withdrawn from the edge 12 of the socket part opening as shown in FIG. 6, whereupon the head part is slid upwardly in said opening as shown in FIG. 7 and then tilted and slid downwardly and outwardly from said opening as shown in FIG. 9. When the fastener parts are disconnected and the strap loop is loose, the locking lever is freely swingable about its pivot.

I claim:

1. In a strap end fastener, the combination with a plate-like socket part having a rectangular opening, of a head part comprising an elongated rectangular plate-like body wider than said rectangular opening in the socket part and formed with a corrugation extending longitudinally of one side thereof centrally of its width with first and second extensions beyond the respective ends of the plate, said corrugation being longer than said opening in the socket part and formed with first and second notches in the sides of said extensions, respectively, at said side of the plate and extending from the extremities of said extensions with their inner ends spaced apart a distance less than the length of said opening in the socket part, and the distance between the inner end of the first notch and the corresponding extension extremity being greater than the distance between the inner end of the second notch an its corresponding extension extremity so that the first extension and second extension may be inserted in succession through said opening from one side of said socket part upon tilting of the head part and sliding thereof alternately in opposite directions to cause engagement in succession of said extensions with the other side of the socket part and locate the inner end of the second notch in abutment with the edge of one narrow side of said opening and locate the inner end of the first notch a distance from the edge of other narrow side of the opening greater than the length of the first extension, said head part having longitudinal slots at opposite sides of said corrugation through which and over the corrugation a flexible strap may be looped, and a locking lever pivoted intermediate its ends on said head part within said corrugation with one end formed with a shoulder disposed beyond the inner end of the first notch and also formed with a lug at its other end extending laterally outwardly through a slot in said corrugation so that in one position of said lever when the head part is in said opening said shoulder is closely juxtaposed to the edge of the corresponding narrow side of said opening in the socket part in locking position to lock the head part against movement out of said opening, said lug when the lever is in said position being engaged by the strap loop when the loop is under tension to urge and hold the lever in said locking position, said lever having a finger piece for manual swinging of the lever against the flexibility of said strap loop over said lug to move said shoulder away from said edge of said opening of the socket part and thereby allow the head part to be slid in and tilted out of said opening to separate said head part from the socket part.

2. In a strap end fastener as defined in claim 1, wherein said socket part has flanges at opposite longitudinal sides of said opening converging toward each other and spaced apart for pressure thereagainst of the strap loop as the head part is inserted into said opening providing for engagement of the strap loop with said lug on the locking lever to swing and hold said lever in said locking position.

3. A strap end fastener head part for connecting an end of a strap to a socket part in the form of a metal plate having a rectangular opening therethrough, said head part, comprising an elongated rectangular plate-like body wider than said rectangular opening in the socket part and formed with a corrugation extending longitudinally of one side thereof centrally of its width with first and second extensions beyond the respective ends of the part, said corrugation being longer than said opening in the socket part and formed with first and second notches in the sides of said extensions, respectively, at said side of the plate and extending from the extremities of said extensions with their inner ends spaced apart a distance less than the length of said opening in the socket part, and the distance beween the inner end of the first notch and the corresponding extension extremity being greater than the distance between the inner end of the second notch and its corresponding extension extremity so that the first extension and second extension may be inserted in succession through said opening from one side of said socket part upon tilting of the head part and sliding thereof alternately in opposite directions to cause engagement in succession of said extensions with the other side of the socket part and locate the inner end of the second notch in abutment with the edge of one narrow side of said opening and locate the inner end of the first notch a distance from the edge of other narrow side of th opening greater than the length of the second extension, and a locking member on said head part within said corrugation with one end formed with a shoulder disposed beyond the inner end of the first notch and also formed with a lug at its other end so that in one position of said member when the head part is in said opening said shoulder is closely juxtaposed to the edge of the corresponding narrow side of said opening in the socket part in locking position to lock the head part against movement out of said opening, said lug when the member is in said position being adapted to be engaged by a strap under tension passing over said corrugation to urge and hold the member in said locking position, said member having a finger piece for manual moving of the member against the flexibility of said strap over said lug to move said shoulder away from said edge of said opening of the socket part and thereby allow the head part to be slid in and tilted out of said opening to separate said head part from the socket part.

4. A strap end fastener head part as defined in claim 3 wherein said head part has a slot extending through said corrugation intermediate its ends, said locking member is a lever pivoted intermediate its ends in said corrugation with said lug at one end extending through said slot and said locking shoulder at it other end, and longitudinal slots at opposite sides of said corrugation through which a strap may be threaded and looped around said corrugation and across said slot in the corrugation to engage said lug.

* * * * *